(12) United States Patent
Klimt

(10) Patent No.: US 10,699,281 B2
(45) Date of Patent: Jun. 30, 2020

(54) SNAP SEAL SYSTEM

(71) Applicant: Tomas Francis Klimt, Melbourne (AU)

(72) Inventor: Tomas Francis Klimt, Melbourne (AU)

(*) Notice: Subject to any disclaimer, the term of this patent is extended or adjusted under 35 U.S.C. 154(b) by 606 days.

(21) Appl. No.: 15/178,482

(22) Filed: Jun. 9, 2016

(65) Prior Publication Data
US 2017/0330199 A1 Nov. 16, 2017

Related U.S. Application Data

(60) Provisional application No. 62/334,907, filed on May 11, 2016.

(51) Int. Cl.
G06Q 30/00 (2012.01)

(52) U.S. Cl.
CPC ... *G06Q 30/0185* (2013.01); *B65D 2251/205* (2013.01); *B65D 2543/00962* (2013.01)

(58) Field of Classification Search
CPC ...... G06Q 30/0185; B65D 2543/00962; B65D 2251/205
USPC .................. D9/416, 434–435, 439, 499, 902
See application file for complete search history.

(56) References Cited

U.S. PATENT DOCUMENTS

| | | |
|---|---|---|
| 1,413,412 A | 4/1922 | Lovell |
| 1,449,433 A | 3/1923 | Munson |
| 1,502,312 A | 7/1924 | Mayhew |
| 1,585,846 A | 5/1926 | Frisbie |
| 1,885,415 A | 11/1932 | Collison |
| 2,494,359 A | 1/1950 | Roth |
| 2,500,773 A | 3/1950 | Robins |
| 2,535,262 A | 12/1950 | Brownsey |
| 2,820,309 A | 1/1958 | Egan |

(Continued)

FOREIGN PATENT DOCUMENTS

EP 0337181 10/1989

OTHER PUBLICATIONS

Klimt, Tomas F., "International Search Report and Written Opinion", PCT Application No. PCT/IB2017/052421, (dated Jul. 14, 2017).

(Continued)

*Primary Examiner* — Tamara Griffin
*Assistant Examiner* — Shaun D Sensenig
(74) *Attorney, Agent, or Firm* — Womble Bond Dickinson (US) LLP

(57) ABSTRACT

A method including accepting a registration of an item in a database, the registration including a registrant's ownership information and an identifier about the item known to the registrant; and verifying the item is the registered item to a buyer of the item in response to the buyer providing the identifier. A method of authenticating an item including registering an item with a database, the registration including a registrant's ownership information; providing a seal having a public identification tag on a first side and a private identification tag on a second side; storing data of the public identification tag and data of the private identification tag in the database; and affixing the seal on a container containing an item or a representation of the item, when the seal is not broken, the public identification tag is visible and the private identification tag is not visible.

8 Claims, 9 Drawing Sheets

(56) References Cited

U.S. PATENT DOCUMENTS

| | | | |
|---|---|---|---|
| 3,107,783 A | | 10/1963 | Corey et al. |
| 3,169,023 A | | 2/1965 | Rivas |
| 4,389,063 A | | 6/1983 | Ryan |
| 4,425,999 A | * | 1/1984 | MacDonald ........ E05B 73/0017 |
| | | | 206/1.5 |
| 5,358,281 A | | 10/1994 | Greig |
| 5,685,424 A | | 11/1997 | Rozek et al. |
| 5,732,979 A | | 3/1998 | Finke et al. |
| 5,982,284 A | | 11/1999 | Baldwin et al. |
| 6,069,955 A | * | 5/2000 | Coppersmith ....... G06Q 10/087 |
| | | | 380/200 |
| 6,375,003 B1 | | 4/2002 | Lethen et al. |
| 6,591,252 B1 | * | 7/2003 | Young .................. G06Q 20/204 |
| | | | 705/17 |
| 8,271,394 B1 | * | 9/2012 | Bogaard ................ G06Q 20/12 |
| | | | 705/64 |
| 9,575,724 B1 | * | 2/2017 | Liberatori, Jr. ........... G06F 7/02 |
| 2004/0060976 A1 | | 4/2004 | Blazey et al. |
| 2008/0140432 A1 | * | 6/2008 | Fenn .................... G06Q 10/087 |
| | | | 705/317 |
| 2011/0086194 A1 | | 4/2011 | Williams |
| 2013/0249205 A1 | * | 9/2013 | Bellmyer .................. B65C 9/00 |
| | | | 283/81 |
| 2016/0027021 A1 | * | 1/2016 | Kerdemelidis ...... G06Q 30/018 |
| | | | 705/317 |

OTHER PUBLICATIONS

Internation Preliminary Report on Patentability dated Nov. 13, 2018, for related PCT Patent Appln. No. PCT/IB2017/05421 9 Pages.

* cited by examiner

SNAP SEAL SYSTEM

CROSS-REFERENCE TO RELATED APPLICATION

The application is a claims the benefit of the earlier filing date of U.S. Provisional Patent Application No. 62/334,907, filed May 11, 2016 and incorporated herein by reference.

FIELD

Item authentication, a method of authenticating an item and tracking or maintaining chain of title of the item. Other embodiments are also disclosed.

BACKGROUND

There exists a need for authenticating originality and ownership of an item and maintaining a chain of title for the item. Such methods are especially useful for rare collectible items as well as pharmaceutical drugs, where authenticity and originality is paramount.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of concision and reducing the total number of figures, a given figure may be used to illustrate the features of more than one embodiment, and not all elements in the figure may be required for a given embodiment.

FIG. 11 shows a flow chart of a method to be performed by a seller to seal an item in a container and register the item. FIG. 12 shows a flow chart of a method to be performed by a server in connection with registering an item and verifying the authenticity of the item. FIG. 13 shows a flow chart of a method to be performed by a buyer of the item from the seller.

DETAILED DESCRIPTION

Several embodiments are described with reference to the appended drawings. While numerous details are set forth, it is understood that some embodiments may be practiced without these details. In other instances, well-known structures, and techniques have not been shown in detail so as not to obscure the understanding of this description.

A method and system for authenticating ownership of an item and maintaining chain of title of an item is disclosed. The method and system is especially appropriate with rare, valuable or collectible items, such as rare wines, works of art (including digital art), luxury items, baseball cards, comic books, original vinyl records, and toys. Chain of title may be important to buyers of such collectibles, as authenticity is paramount. The method and system may discourage fraud and ensure secure transfer of ownership. For example, if a seller attempting to sell a collectible item is not listed as the last owner in the chain of title, the buyer may be alerted of the potential of fraud, including forgery or the item being stolen. Although breaks in chain of title may be due to failure of a buyer to register the transfer of ownership, for valuable, rare or collectible items, there is an increased incentive for the buyer to register the transfer of ownership. Additional security is provided by a physical seal system that, in one embodiment, is used in conjunction with an authentication system to ensure ownership and that the transfer of ownership is authentic. The combined physical seal system and authentication system may be used to authenticate originality of a collectible item, a precious item (e.g. jewelry), or a pharmaceutical drug to ensure that the item was obtained from a legitimate source.

The method of authenticating ownership in one embodiment has the benefit of allowing a person to show proof of ownership of an item without having to physically possess the item itself. It allows a seller, for example, to sell an item to the buyer without having to deliver the item to the buyer at the moment of transaction. Instead of providing the item to the buyer upon sale, in one embodiment, the seller provides a representation of the item, such as a token or replica (e.g. a miniature replica) placed in a sealed container, to the buyer. In the example of digital art or other items that can be embedded in digital media, the token or replica may be a smaller GIF file of the digital art or a portion of the art or a lower resolution version of a portion including the entire portion of the art, or in the case of music such as a vinyl record, a digital representation of the music. The representation of the item acts as a token that proves ownership of the item through an authentication system. The new owner, who possesses the token, may prove ownership and take possession of the item at a later time or transfer ownership without ever taking possession of the item.

Figure 1:
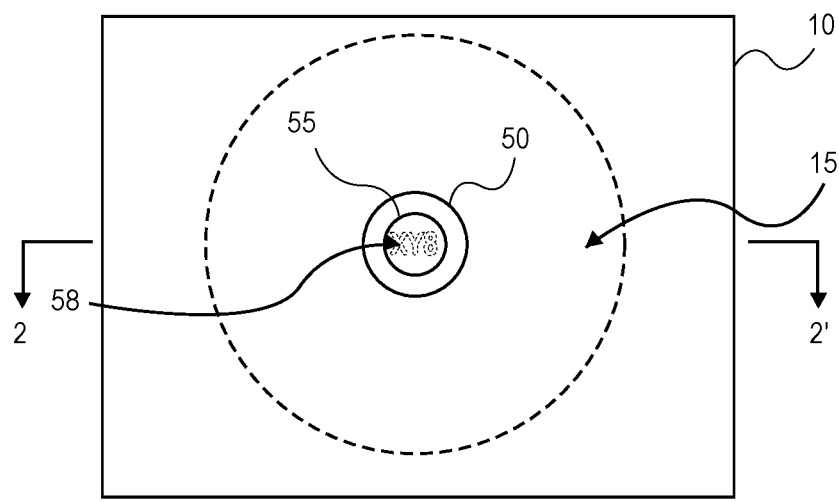
FIG. 1 shows a top view of an embodiment of a container for an item operable to contain a vinyl record or a replica of a vinyl record with a seal on the container.
Figure 2:
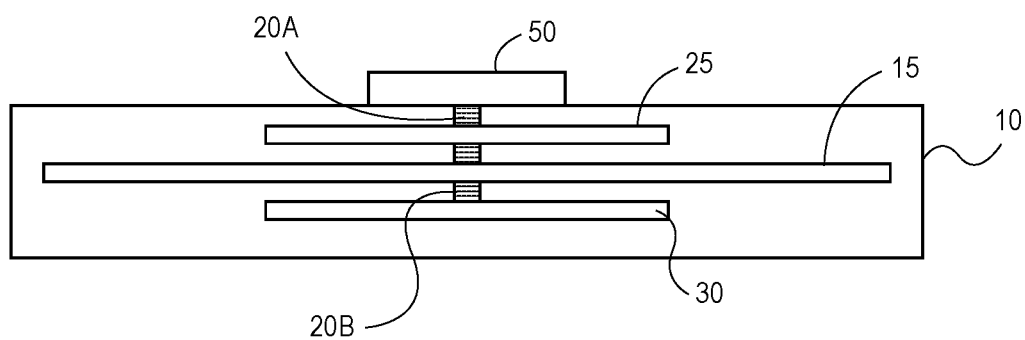
FIG. 2 shows a cross-sectional side view of the container of FIG. 1 through line 2-2'.

Referring to FIGS. 1 and 2, methods and systems may be embodied using a sealed container. FIG. 1 shows a top view of a container containing an item that is a vinyl record. FIG. 2 is a cross-sectional side view of the container of FIG. 1. Referring to FIGS. 1 and 2, in this embodiment, container 10 is a plastic paper or other material container having dimensions and a volume therein to contain a vinyl record (e.g. a 12 inch, 10 inch, 7 inch polyvinyl chloride disc having a thickness on the order of one quarter of an inch) or a replica of a vinyl record (e.g. a miniature version of the record). Container 10 may be joined at its ends such as by an adhesive or wrapped plastic wrap enveloping the container. Disposed in the volume of container 10 is vinyl record 15 or a replica of a vinyl record (e.g. a miniature version of a vinyl record). As seen in FIG. 2, disposed through the center of container 10 is post 20A and post 20B. Post 20A and post 20B (e.g. threaded posts) may be a single post designated by separate portions or different posts that mate together. FIG. 2 shows posts 20A/20B extending from a top surface of container 10 (as viewed) through the opening in record 15. On the first side of record 15 (top side as viewed) is protection disc 25. On the second side of record 15 (bottom side as viewed) is protection disc 30. Protection disc 25 and protection disc 30 are each a material such as cardboard that will not damage (e.g. not scratch) record 15 and, in one embodiment, have a diameter smaller than or equal to the diameter of record 15. Each of protection disc 25A and 25B have an opening through the center of the disc. Posts 20A/20B are disposed in an opening through each of protection disc 25 and protection disc 30.

FIG. 1 and FIG. 2 show seal 50 on the outside top surface of container 10. Seal 50 has, for example, a body of a thin metal or plastic disc that is attached at its underside to post 20A. Seal 50 is attached to post 20A in a manner such that it must be permanently broken or fractured to remove so that once it is removed, it cannot be replaced (e.g. the connection between seal 50 and post 20A requires a physical fracture or break between the seal and post to separate the seal as opposed to a connection where seal 50 and post 20A can be reattached by, for example, threaded connection, force fit or other attachment system). In another embodiment, the seal includes a lock where seal 50 can be broken only through the use of a key designated for the lock.

In one embodiment, seal 50 may contain code or private identification tag 58 (e.g. an alphanumeric code) that may be revealed when seal 50 is broken. In one embodiment, seal 50 includes small cap 55 that may contain within it code 58. In one embodiment, cap 55 is attached to seal 50 by an attachment system requiring a fracture or break to separate any part of the cap from the seal and not permit cap 55 to be reattached without a visible indication that it had been removed. Examples of attaching cap 55 to the body of seal 50 so that the removal of the cap requires a fracture or break includes attachment by glue, solder or a thermal bond. Code 58 is not visible without breaking and opening cap 55. Once cap 55 is broken and opened, code 58 may be revealed. In another embodiment, a code is alternatively or additionally placed on one of protection discs 25 and 30. Access to the protection discs requires breaking of seal 50 and opening of container 10 to reveal its contents such as by removing the wrapping on the exterior of container 10 (e.g. any plastic covering a container opening), removing seal 50 and post 20A and post 20B and accessing the inside of container 10.

In one embodiment, ownership of an item is recorded at a location. In one embodiment, the location is a central database associated with a server wherein the central database is operable to store data regarding an item and its ownership. The method of maintaining chain of title of the item allows record keeping of ownership of the item. When ownership of the item changes, the record may be updated at the central database to reflect the change of ownership. Change of ownership may occur without an actual exchange of the item itself during the exchange. The item may be kept and stored at a location remote from the transaction. The seller or a third party may act as a custodian of the item that is sold. For example, the item may be kept in a safe or a vault for storage. If the buyer desires to physically take possession of the item, the buyer may provide authentication information to the custodian of the item to prove ownership of the item. Upon authentication, the custodian may then deliver the item to the buyer.

Figure 3:
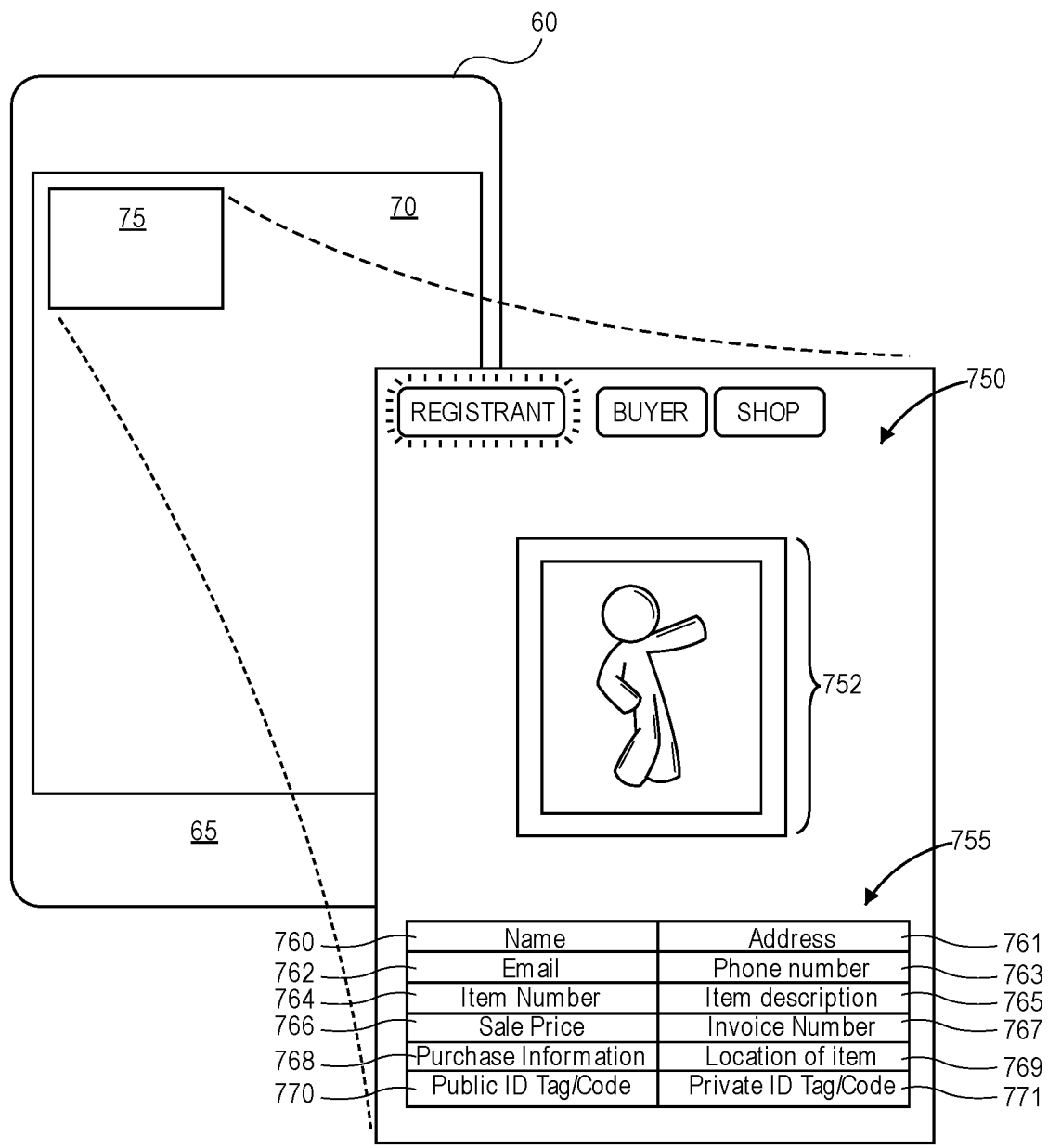
FIG. 3 shows a front view of an electronic device with an embodiment of a user interface for a registrant or seller of an item to register the item with a server.

Referring to FIGS. 3-6, methods and systems for authenticating an item and establishing and maintaining a chain of title may be embodied in a self-contained program or piece of machine-readable instructions (software) designed for such a purpose (herein referred to as application or app) on an electronic device. FIG. 3 shows electronic device 60 such as a computer, smartphone, tablet computer, personal digital assistant, television, laptop computer, desktop computer, music player, video player, hand held camera, movie recorder, or the like. In one embodiment, as shown in FIG. 3, electronic device 60 is a portable or mobile hand held device, such as a smartphone. In another embodiment, electronic device 60 may be a desktop computer.

Figure 4:
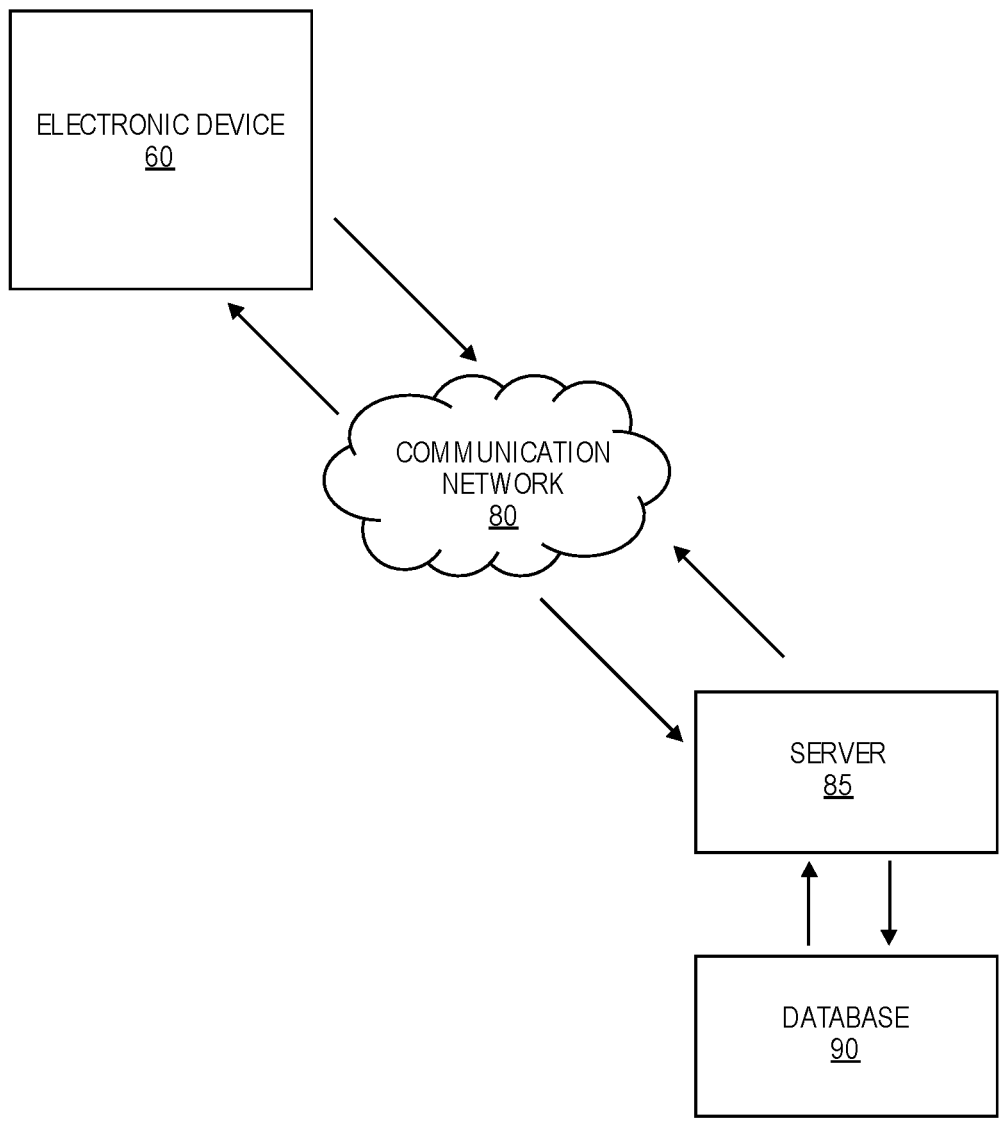
FIG. 4 shows a diagram of the electronic device of FIG. 3 communicatively linked through communications network to a server and a database.

Electronic device 60 includes housing 65 that contains a processor, memory, communications circuitry, a power supply, an input component, display 70, a camera, one or more sensors and one or more microphones. Memory is, for example, volatile memory, non-volatile memory, solid-state drive memory, flash memory, cache memory, read-only memory, random access memory, or any suitable storage component. Display 70 is, for example, a desktop screen, a touchscreen on a smartphone, a television, a laptop screen, etc. Display 70 may be a liquid crystal display (LCD), a light emitting diode (LED), an organic light emitting diode (OLED), a three-dimensional (3D) or any other suitable type of display device. The one or more sensors may include an accelerometer, gyroscope, fingerprint reader, barcode reader or the like. In one embodiment, the barcode reader may read barcodes through a camera of electronic device 60. Electronic device 60 also includes communications circuitry that may support Wi-Fi, Bluetooth, TCP/IP, HTTP, FTP, LTE or any suitable communications protocol to communicate with a communications network. FIG. 4 shows a representation of a communication link over a communication network between electronic device 60 and a server and database. As shown in FIG. 4, communications network 80 such as the Internet or an intranet may be in communication with electronic device 60 and separate or distinct server 85. Server 85 may be in communication with database 90. Server 85 includes a processor including non-transitory, machine-readable instructions that when executed cause the processor to perform a method to accept a registration of an item in database 90 wherein the registration includes ownership information of a registrant and an identifier about the item known to the registrant (e.g. a location of the item, identification information).

In one embodiment, electronic device 60 includes an application to communicate with server 85 through communication network 80. Referring again to FIG. 3, application 75 of electronic device 60 includes non-transitory machine-readable instructions that when executed by device 60 present on display 70 of the device a user interface including one or more fields that may receive input from a user, which may be a seller, buyer, or another third party. An inset of FIG. 3 illustrates the executed application on display 70. In this embodiment, application 75 provides one interface or page for a registrant or seller, one interface or page for a buyer of an item and a third interface allowing a buyer to shop or browse and authenticate an item. FIG. 3 shows an interface for a registrant or seller of an item or article.

Referring to FIG. 3, the launched application provides fields for a registration of an item or article by an owner of the item (a registrant) that desires to register ownership and possibly sell the item or article. In this embodiment, interface 750 of application 75 includes area 752 for an image of the item and an area for identification fields 755 related to the registrant or seller information and the item.

A registrant or seller of an item may upload a digital image of an item into area 752 and enter via a keypad identification information in the identification fields 755. In this embodiment, identification fields 755 include registrant or seller name field 760 (e.g. name of individual or company); address field 761; email address field 762; phone number field 763; item number field 764 (e.g. stock keeping unit (SKU) or other identifiable number); item description field 765; sale price field 766; purchase information field 768; location of item field 769; public identification tag field 770; and private identification tag field 771. Additional fields or alternative fields are also contemplated that, in one aspect, provide information about an item such as the condition of an item (e.g. new or used condition). The uploaded registrant or seller registration information (e.g. photograph and field information) is transmitted by application 75 in electronic device 60 to server 85 via communication network 80. Server 85 is in communication with database 90 and directs the storage of the registration information in database 90. Server 85, for example, includes non-transitory machine-readable instructions that when executed by the server cause the server to accept and store registration information in database 90. The registrant or seller may be issued a user name and password by server 85. The machine-readable instructions executable by a processor associated with server 85 include instructions to accept and register a registrant according to a user name and password.

Figure 5:
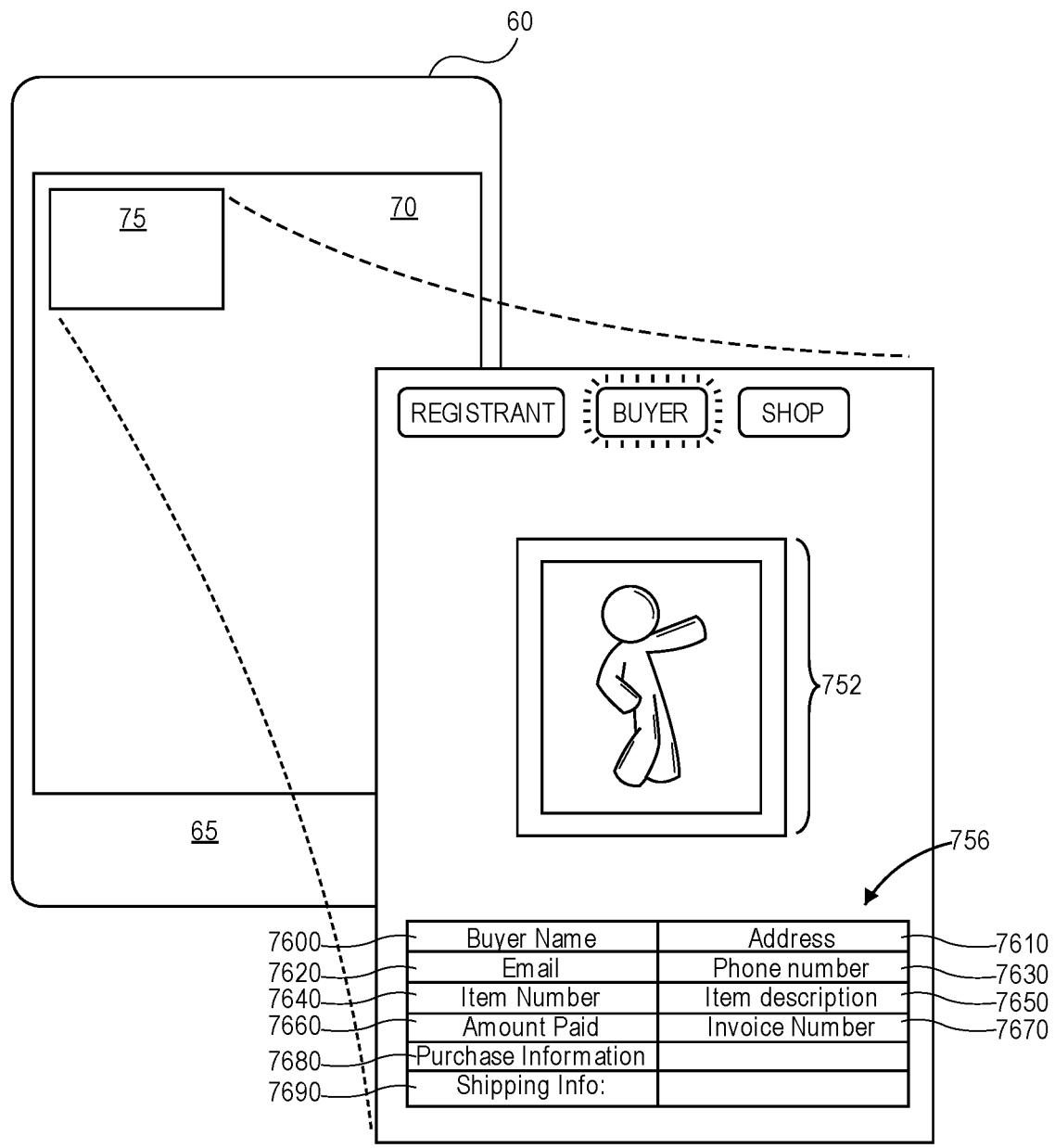
FIG. 5 shows a front view of the electronic device of FIG. 3 with a user interface for a buyer of an item to be registered as the owner of the item.

FIG. 5 shows executed application 75 on display 70 presenting an interface for a buyer of an item or article. The interface of the executed application includes area 752 for displaying an image of the item and fields 756 for buyer identification information and item information. In this embodiment, fields 756 include buyer name field 7600, address field 7610, email address field 7620, phone number field 7630, item number field 7640, item description field 7650, amount paid for item by buyer field 7660, invoice number field 7670, purchase information field 7680 (e.g. credit card information, PayPal®) and shipping information field 7690. The described fields are representative of fields for buyer information. Additional fields or alternative fields are also contemplated.

In one embodiment, the seller of an item may use application 75 to register ownership of an item to the buyer when the seller sells the item to the buyer. For example, a seller of an item may use his smartphone (device 60) containing application 75 to enter the personal information of the buyer using the user interface of application 75. The data entered defines registration information to register the buyer as the owner of the item. Input registration information in fields 756 may be sent over a communication network (e.g. over the internet) to server 85 in communication with database 90 that stores input registration information related to the sale of the item (see FIG. 4). The buyer of the item may be issued a user name and password by server 85 so that the buyer may view the chain of title at any time. In such case, machine-readable instructions executable by a processor associated with server 85 include instructions to accept and register the buyer of the item according to a user name and password. The above registration of the buyer was described from the standpoint of the seller registering the buyer. In another embodiment, the buyer or a third party may register the buyer as the owner of an item.

With regard to an item or article that is a subject of a transaction, in one embodiment, it is desired that, at least as of its first sale, the item may be authenticated. Techniques for authenticating an item may include a location of the item at the time of a potential purchase or identification numbers on the item. An example of authenticating an item based on its location is where a seller inputs information into database 90 of where an item for sale is located.

Figure 6:
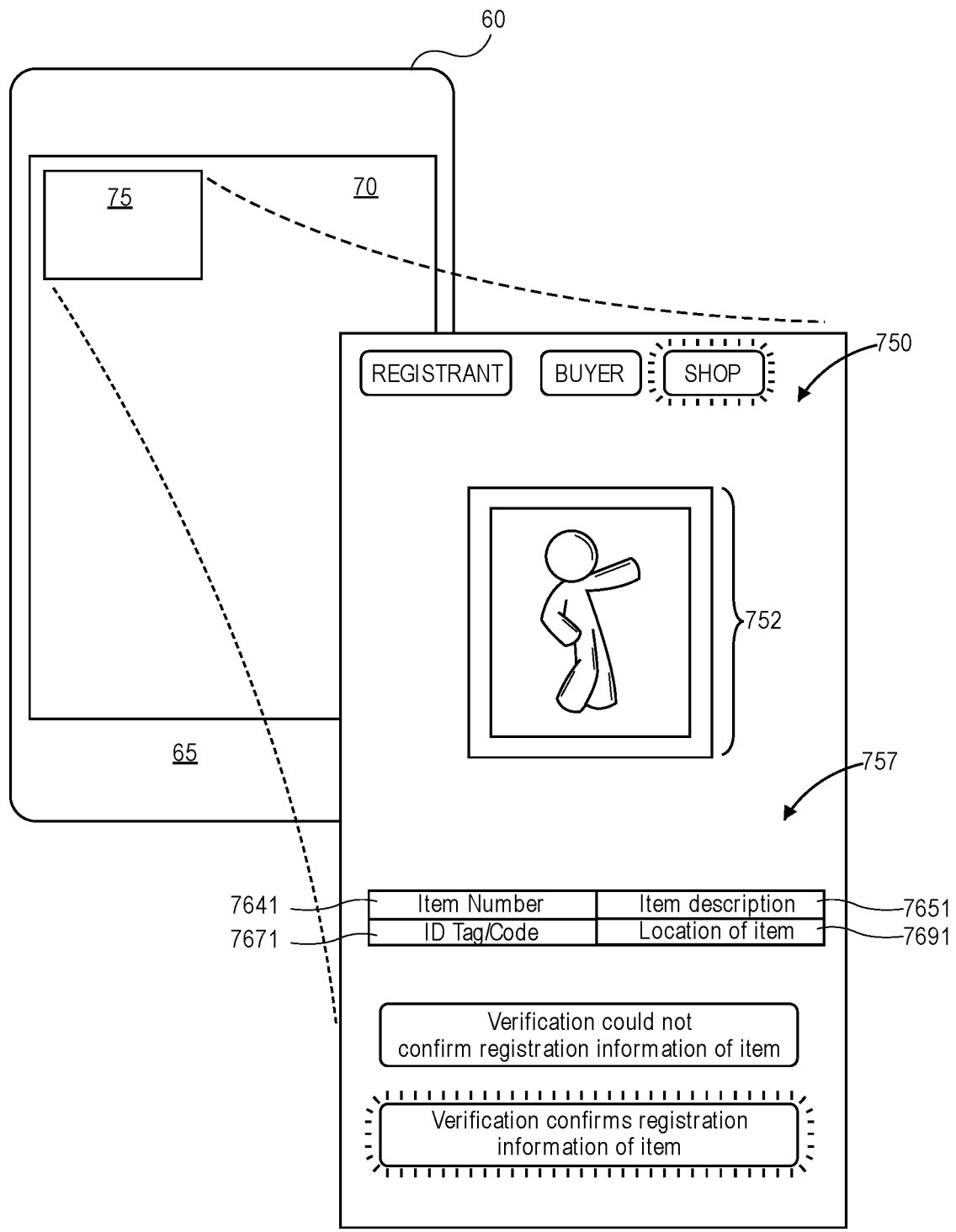
FIG. 6 shows a front view of the electronic device of FIG. 3 with a user interface for a potential buyer to view an item available for purchase.

In one embodiment, in addition to registering a registrant and buyer of an item, application 75 may be used to verify the authenticity of an item based at least on the location of the item. FIG. 6 shows application 75 on display 70 presenting an interface for a potential buyer to shop for an item or article and verify its authenticity based on seller information provided to database 90. In this embodiment, the seller information may be the information described above with respect to FIG. 3. For example, if an item is only sold in select stores, the seller as a registrant would enter into database 90 (e.g. enter information into database 90 using application 75) that the item was available for purchase at a store identified by a particular address (enter store location(s) in field 769 as in FIG. 3).

A potential buyer may see the item at a store in his/her location and, prior to purchasing the item, use the shop interface of application 75 to search whether the item is registered in database 90 and, if so, to verify whether the item is sold by the seller at the store location. The buyer would execute application 75 on device 60, enter a picture of the item in field 752 and/or information about the item in identification field 757. In one embodiment, identification fields 757 include item number field 7641; item description field 7651; location of item field 7691 (e.g. a location of the store in which the buyer saw the item); and optionally identification tag or code field 7671 associated with item. The information uploaded to application 75 by the potential buyer of the item is sent via communication network 80 to server 85. In one embodiment, the non-transitory machine-readable instructions included in server 85 include instructions that when executed by the associated processor cause the processor to verify an item is a registered item in database 90 to a potential buyer of the item in response to the buyer providing an identifier or identifier information (e.g. a location of the item). In this example, if the store location matches a store registered by the seller in database 90, application 75 displays a confirmation message to the potential buyer that a registered item in database 90 matched the information provided by the potential buyer. If the information was not a match, application 75 displays a message that the information provided does not confirm the item as registered in database 90. FIG. 6 shows an example where the information was confirmed. Based on the registration information in database 90, including location information about an item, the potential buyer has an assurance that the item is authentic. If the store location does not match a registered store, the potential buyer is not assured as to the authenticity of the watch.

In addition or as an alternative to authenticating an item based on the location of the item, an item may be authenticated by a code or other identification on the item. One technique for authenticating a physical item or article is through the use of a seal. FIGS. 1 and 2 heretofore described the use of a seal and an optional secret code or private identification tag (e.g. alphanumeric code) associated with a container, the seal having to be broken to access the contents of the container. In the embodiment described, the container is operable, in one embodiment, to contain vinyl record 15 or a replica of a record. Referring again to FIGS. 1 and 2, the seller of vinyl record 15, prior to affixing seal 50, in one embodiment, provides code 58 associated with the vinyl record to database 90 in conjunction with registering ownership in the seller of vinyl record 15 (e.g. enters code 58 in private identification tag field 771 field (see FIG. 3). Representatively, a seller of record 15 registers the record in database 90 using application 75 as described with reference to FIG. 3. A subsequent buyer of vinyl record 15 may then search for the vinyl record through application 75 such as by using the shop interface described with reference to FIG. 6. If the buyer finds vinyl record 15 in database 90, the buyer can compare information in the database with information available to the buyer (e.g. seller information, location of vinyl record, etc.). Thus, without breaking seal 50 on container 10, information in database 90 retrieved by application 75 provides a first level of confidence to the buyer that the item is authentic. If the buyer breaks the seal to access code 58, the buyer may use application 75 to enter code 58 (e.g. in identification tag field 7671 [see FIG. 6]), which is sent to server 90 over communication network 80. The received code 58 is compared to a stored code associated with the registered item (vinyl record 15). If there is a match, the buyer has a second level of confidence that the item is authentic. If the buyer purchases vinyl record 15, the buyer or seller may update database 90 with ownership information of the buyer so that he/she is recorded as the new owner by, for example, using the buyer interface of application 75 described above with reference to FIG. 5.

Figure 7:
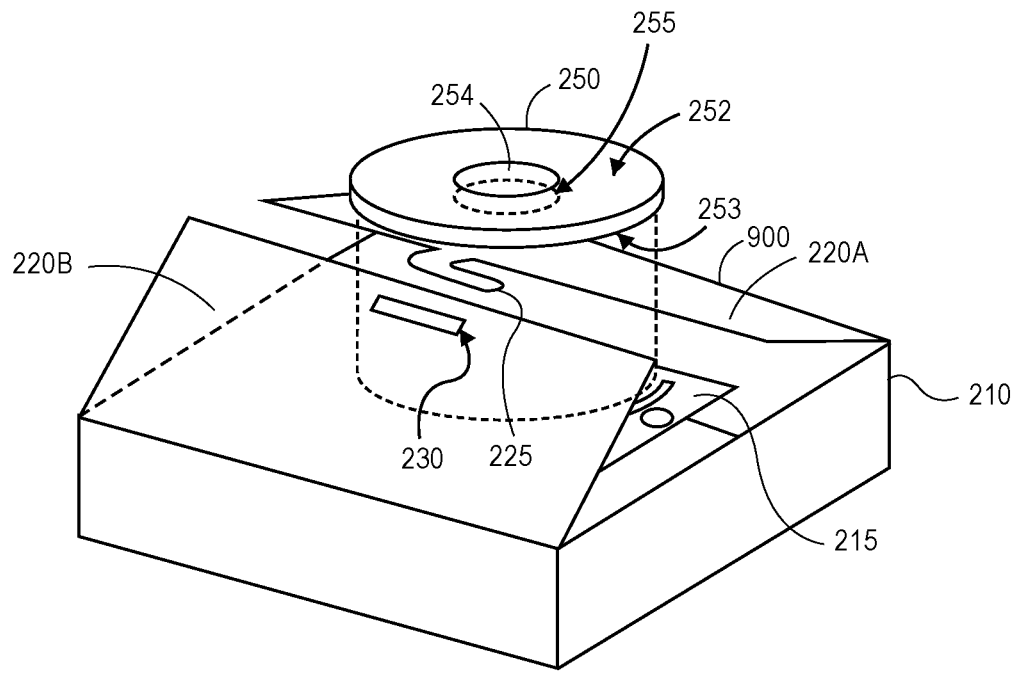
FIG. 7 shows an exploded top side perspective view of an embodiment of a container for an item or a representation of the item with a seal on top of the container.

FIG. 7 shows an embodiment of a container including a volume that is operable to completely contain an item or article or a representation of the item or article. Referring to FIG. 7, container 210 in this embodiment is a rectangular box constructed of plastic, metal, cardboard or other material. Container 210 may be sized to have a volume therein (defined, in this embodiment, by a base and two pairs of opposing side walls projecting from the base) to contain the item or article or a token of ownership to the buyer (e.g. a small version or a representation of a portion of an item or article). In this embodiment, container 210 contains flap 220A and flap 220B defining a superior surface of the container. Each of flap 220A and flap 220B has one side connected to a respective wall of container 210 and an opposite free side. When the free sides of flap 220A and flap 220B are brought together, container 210 contains item 215 therein. Once brought together, the free sides of the flaps may be connected to at least one pair of the opposing sidewalls and optionally to each other by adhesive or tape. In one embodiment, one flap may contain a protruding tab to mate with an opening in the other flap. FIG. 7 shows tab 225 protruding from the free side edge of flap 220A (e.g. approximately in the middle of the side edge) and opening 230 in flap 220B. Bringing together of opposing free sides of the flaps allows tab 225 to be inserted into opening 230. When ends of flap 220A and flap 220B are brought together, the end of tab 225 is under flap 220B. In another embodiment, container 210 may have four flaps that come together optionally with more than one tab or other securing system.

Figure 8:
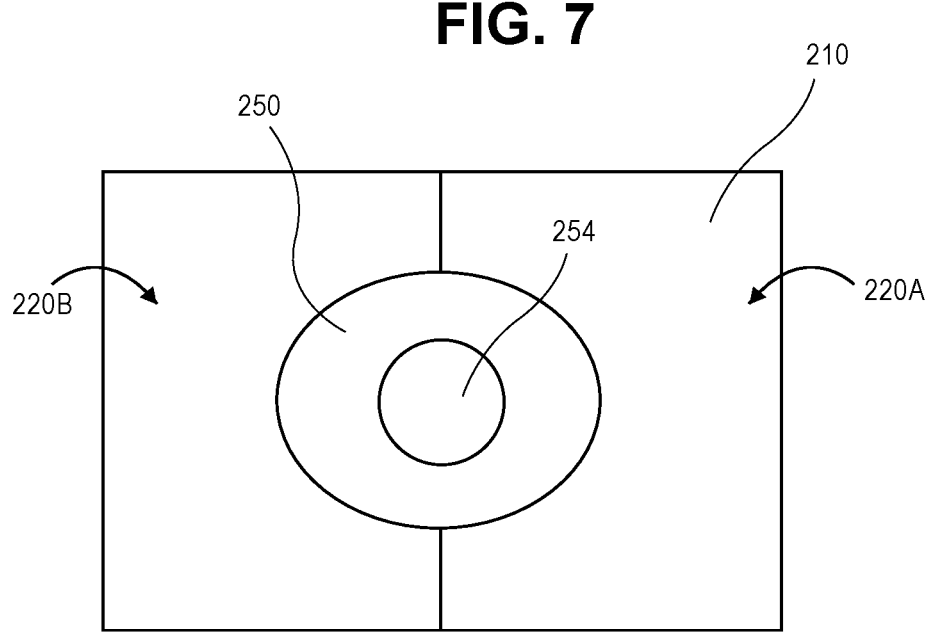
FIG. 8 shows a top view of the container of FIG. 7 with the seal affixed thereon.

Disposed across and connected to each of flap 220A and flap 220B in the embodiment illustrated in FIG. 7 is seal 250. Seal 250 may be a sticker, for example, with front side 252 and opposing backside 253. Front side 252 may be non-adhesive and may have public identification tag 254 that is visible to anyone. Backside 253 may be adhesive and may have private identification tag 255 that is not visible until seal 250 is broken. Breaking of seal 250 by removing or partially removing the seal may reveal private identification tag 255 on the underside thereof (shown in dashed lines). Public identification tag 254 and private identification tag 255 may be a series of numbers, symbols, letters, alpha numerals, bar codes, etc. The seller may randomly generate a pair of private identification tag 255 and public identification tag 254 or this may be done by server 85 or application 75 (e.g. non-transitory machine-readable instructions associated with application 75) or a processor of server 85 can be executed to perform a method to generate random tags (e.g. random alphanumeric codes) and to provide such tags to the seller. The pair of public identification tag 254 and private identification tag 255 is associated with the item. The seller may store public identification tag 254 and private identification tag 255 for later authentication. In one embodiment, at least one of the pair of public identification tag 254 and private identification tag 255 are stored in database 90 connected to or otherwise associated with server 85 (see FIG. 4). FIG. 8 shows a top view of container 210 with seal 250 in place attached to flap 220A and flap 220B. As shown in FIG. 8, only public identification tag 254 is visible.

In one embodiment, a seller executes a transaction to sell item 215 to a buyer. In addition to inputting personal information of the buyer into the registrant interface of application 75 (see FIG. 3), the seller may input public identification tag 254 and private identification tag 255 of seal 250 into the application, each of which are specific to item 215. In one embodiment, application 75 may include barcode-scanning functionality that allows the seller to scan public identification tag 254 represented in a barcode on seal 250. In addition to containing public identification tag 254, the barcode contains data or information that when communicated to server 85 provides private identification tag 255 or links public identification tag 254 to private identification tag 255 without providing it, for example, to application 75. Public identification tag 254 and private identification tag 255 associated with item 215 may be stored in server 85 with database 90. Once registered, the chain of title and ownership history is available for viewing. Settings may be adjusted to specified privacy settings. It may be publicly available or limited to a subset of intended viewers.

A prospective buyer may desire to first check if a seller is actually selling an item. The prospective buyer may enter information relevant to the item into application 75 through the buyer interface (FIG. 5) or the shop interface (FIG. 6). Application 75, in one embodiment, includes a search field that may enable a prospective buyer to find item 215. The buyer may enter into the search field various keywords that may be related to item 215. Once the desired item is found through the search, the buyer may view information related to the item, which may include information related to the identification of the seller, location, contact number, map, etc. This allows the buyer to confirm that the seller is selling the item.

Once the item is sold to the buyer and either the item or a token of ownership is to be transferred to the buyer, in one embodiment, prior to transfer, seal 250 having public identification tag 254 on a visible, non-adhesive side and private identification tag 255 on a non-visible, adhesive side if not already affixed to container 210 is affixed to container 210 with item 215 placed inside. In one embodiment, sidewalls of container 210 may be made of clear plastic so that item 215 or a representation thereof may be visible without opening container 210. In such an embodiment, private identification tag 255 remains hidden from view (e.g. flap 220A and flap 220B are opaque).

Once the buyer receives sealed container 210, the buyer may authenticate the item at any time. If the original buyer (buyer A) chooses to sell item 215 to another buyer (buyer B), buyer A can authenticate ownership of item 215 to buyer B. Public identification tag 254 is on the visible side of seal 250. Buyer A can break seal 250 to obtain private identification tag 215 on the non-visible side of seal 250. Buyer A can provide both public identification tag 254 and private identification tag 255 to the seller (or any entity responsible for maintaining chain of title) through application 75. Buyer A inputs public identification tag 254 and private identification tag 255 into appropriate fields of application 75. Application 75 receives public identification tag 254 and private identification tag 255 from Buyer A, and sends them to server 85. Machine-readable non-transitory instructions stored in server 85 can then be executed that compare both the received public identification tag 254 and private identification tag 255 with the previously stored public identification tag 254 and private identification tag 255. If the stored identification tags match the received identification tags, the machine-readable instructions confirm the match and prompt server 85 to provide authentication message to application 75. If the stored private identification tag 255 does not match the received private identification tag 255, server 85 provides a non-authentication message to application 75. Buyers A and/or B may view authentication message, which may also reflect the current registered owner of the item. In another embodiment, there may be a field in application 75 that allows authentication message or non-authentication message to be sent to an email address, telephone number via text, etc.

Once the transaction has been executed, buyer A or buyer B may update the chain of title to reflect buyer B as the new owner of the item through application 75. Application 75 would send the updated ownership information to server 85, which updates the record in database 90. In one embodiment, during the update of transfer of ownership, application 75 requires not only the user name and password of buyer A (seller), but also private identification tag 255 for additional security. If buyer B is not registered with server 85, buyer B may register by downloading application 75 and providing information such as described above. In one embodiment, buyer B may request a new seal, including a new pair of public identification tag 254 and private identification tag 255 be issued and delivered to her so that she may replace broken seal 250. This process may be repeated when buyer B decides to sell an item to yet another buyer.

Figure 9:
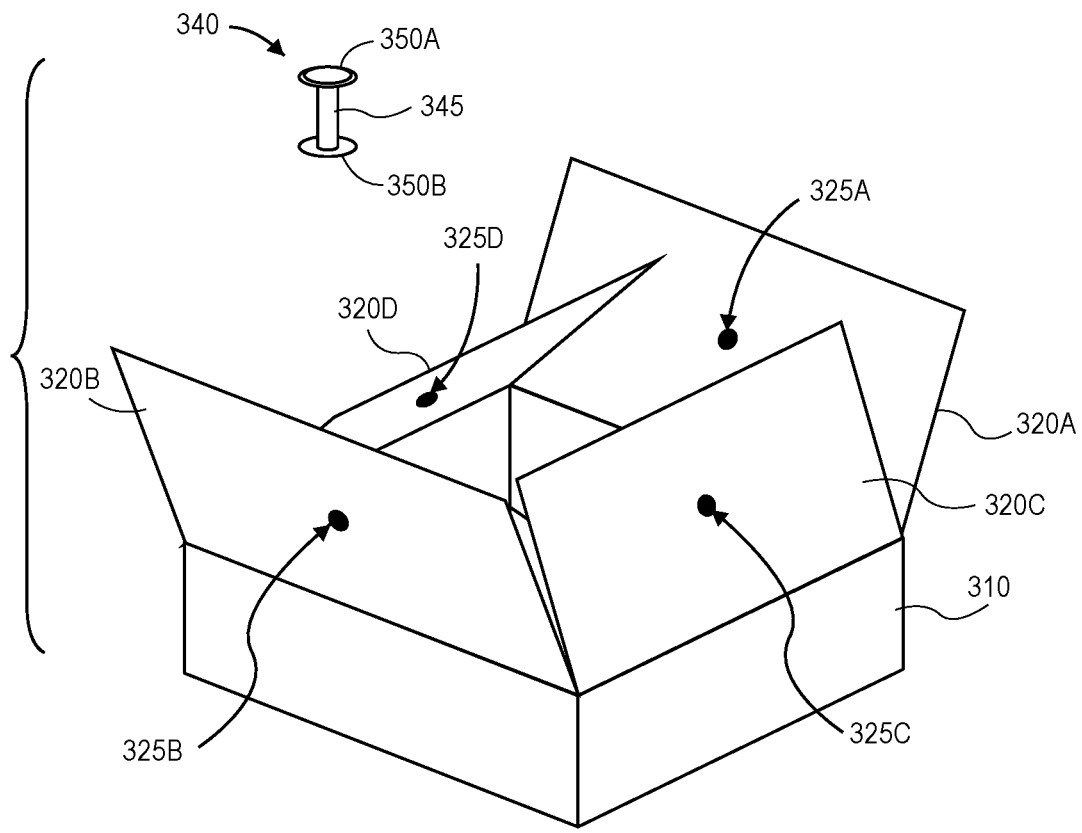
FIG. 9 shows an exploded top side perspective view of another embodiment of a container for an item or a representation of the item and a seal operable to be connected to top flaps of the container.

FIG. 9 shows another embodiment of a container including a volume that is operable to completely contain an item or article or a representation of the item or article. Container 310 in this embodiment is a rectangular box constructed of plastic, metal, cardboard or other material. Container 310 may be sized to have a volume therein (defined, in this embodiment, by a base and two pairs of opposing side walls projecting from the base) to contain the item or article or a token of ownership to the buyer. In this embodiment, container 310 contains flap 320A, flap 320B, flap 320C and flap 320D where one of opposing flaps 320A and 320B overlaps the other and one of opposing flaps 320C and 320D overlaps the other when the flaps are in the closed position (parallel to the base of the container) defining a superior surface of the container. When flaps 320A-320D are in a closed position, container 310 contains the item or token therein. In this embodiment, each flap has an opening therethrough. FIG. 9 shows opening 325A in flap 320A; opening 325B in flap 320B; opening 325C in flap 320C; and opening 325D in flap 320D. When the flaps are in the closed position, openings 325A-325D are aligned. Openings 325A-325D each have a diameter for a post of a seal to be inserted therethrough. FIG. 9 shows seal 340 including post 345 operable to be positioned through openings 325A-325D and seal portion 350A and seal portion 350B operable to connect to respective opposite ends of post 345.

Figure 10:
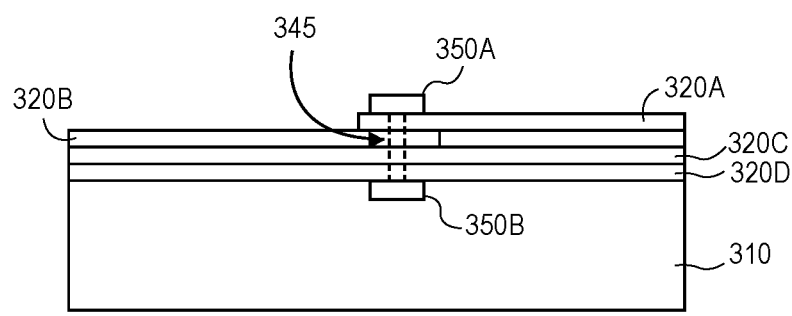
FIG. 10 shows the container of FIG. 9 with the top flaps in a closed position and the seal connected to each of the top flaps.

FIG. 10 shows the container of FIG. 9 with flaps 320A-320D in a closed position and post 345 disposed through openings 325A-325D and seal portion 350A and seal portion 350B connected at opposite ends of the post. Seal portion 350A is exposed or visible on top of container 310. Seal portion 350B is hidden from view under the flaps. In one embodiment, post 345 is a metal or plastic rod that may be threaded at its ends. Seals 350A-350B include, for example, a body of thin metal or plastic discs that are respectively attached to opposite ends of post 345. Seal portions 350A-350B are attached to post 345 in a manner such that it must be permanently broken or fractured to remove so that once it is removed, it cannot be replaced (e.g. the connection between each of seal portion 350A and seal portion 350B and post 345 requires a physical fracture or break between the seal and post to separate the seal as opposed to a connection where the seal and post can be reattached by threaded connection, force fit or other attachment system). In another embodiment, exposed seal portion 350A includes a lock. The seal can be broken only through the use of a key designated for the lock. To place seal 340 on container 310, seal portion 350B is attached to post 345 then inserted through openings 325A-325D. Seal portion 350A is then attached to post 345. In this configuration, seal 340 is attached only to flaps 320A-320D of container 310. In one embodiment, one or both of seal portions 350A-350B may contain a secret code (e.g. an alphanumeric code) that may be revealed when seal 340 is broken. In one embodiment, seal portion 350A may include a small cap that may contain within it a code as described above with reference to FIGS. 1-2. In another embodiment, a code or portion of a code is placed on seal portion 350B. Access to the code or portion of the code requires breaking of seal 340. For example, in one embodiment, a portion of the code is visible on a surface of seal portion 350A when seal 340 is attached to container 310 and a second portion of the code is on seal portion 350B. Access to the entire code requires access to seal portion 350B by opening container 310.

In another embodiment, the method and system may be used to authenticate a transfer of ownership of digital art. A buyer may purchase the digital art piece, which may be in any common format, such as JPEG, BMP, GIF, IMG, etc. Instead of receiving a full resolution version of the digital art piece, the buyer may receive a representation of the digital art piece that is a lower resolution version. The buyer may redeem a full resolution version of the digital art piece by verifying ownership through the public/private identification tag system. In one embodiment, the digital art or a representation of the digital art is stored in a medium as an item that can be contained, for example, as described with reference to FIGS. 1 and 2 or FIGS. 9 and 10 and exchanged between a seller and a buyer. In another embodiment, no physical representation or item is exchanged. Only a digital representation at a lower resolution or the digital art piece at a full resolution is exchanged. Upon purchase of the digital art piece, the seller (or any entity responsible for maintaining chain of title) may store registration information of the buyer such as at database 90 associated with server 85. The seller may provide, and buyer may receive, the lower resolution representation of the digital art piece, along with a public identification tag and a private identification tag, for example, in database 90. The seller also stores the public identification tag and private identification tag. If the buyer desires to obtain the full resolution version of the digital art piece, the buyer may enter the public identification tag and private identification tag into the appropriate fields of application 75. The buyer may also enter registration information. Representatively, server 85 receives the public identification tag and private identification tag, and/or registration information. The received public identification tag and private identification tag and/or registration information are then compared with the previously stored records. If the received public identification tag and private identification tag and/or registration information matches with the stored public identification tag and private identification tag and/or registration information, then it is verified that the buyer is authentic. The seller may then provide the buyer with the full resolution version of the digital art piece through application 75 over the Internet. The buyer may download the digital art piece via application 75.

Figure 11:
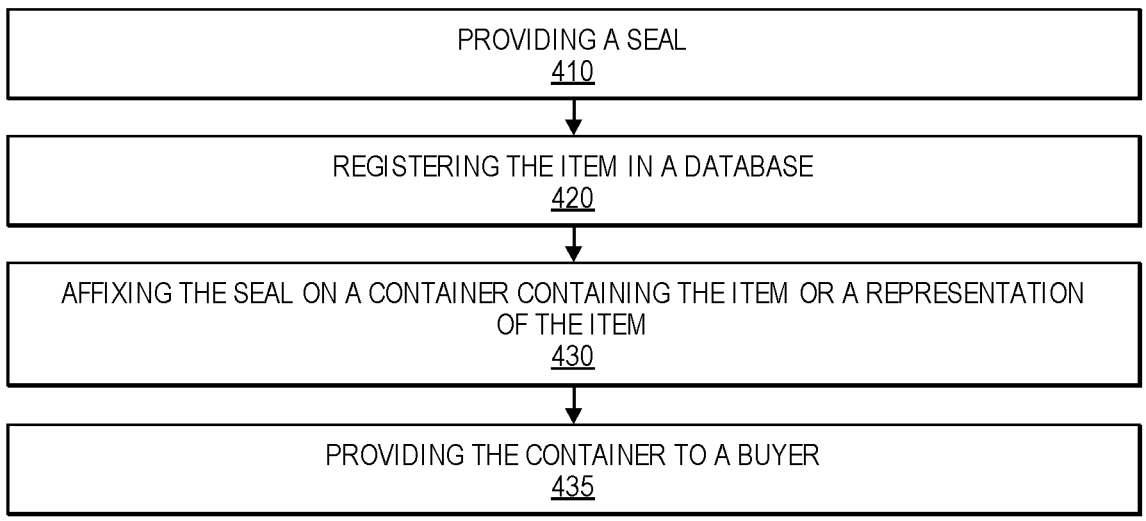
FIGS. 11-13 show flow charts for a method of registering an item with a database and selling the item to a buyer and the buyer verifying the authenticity of the item.
Figure 12:
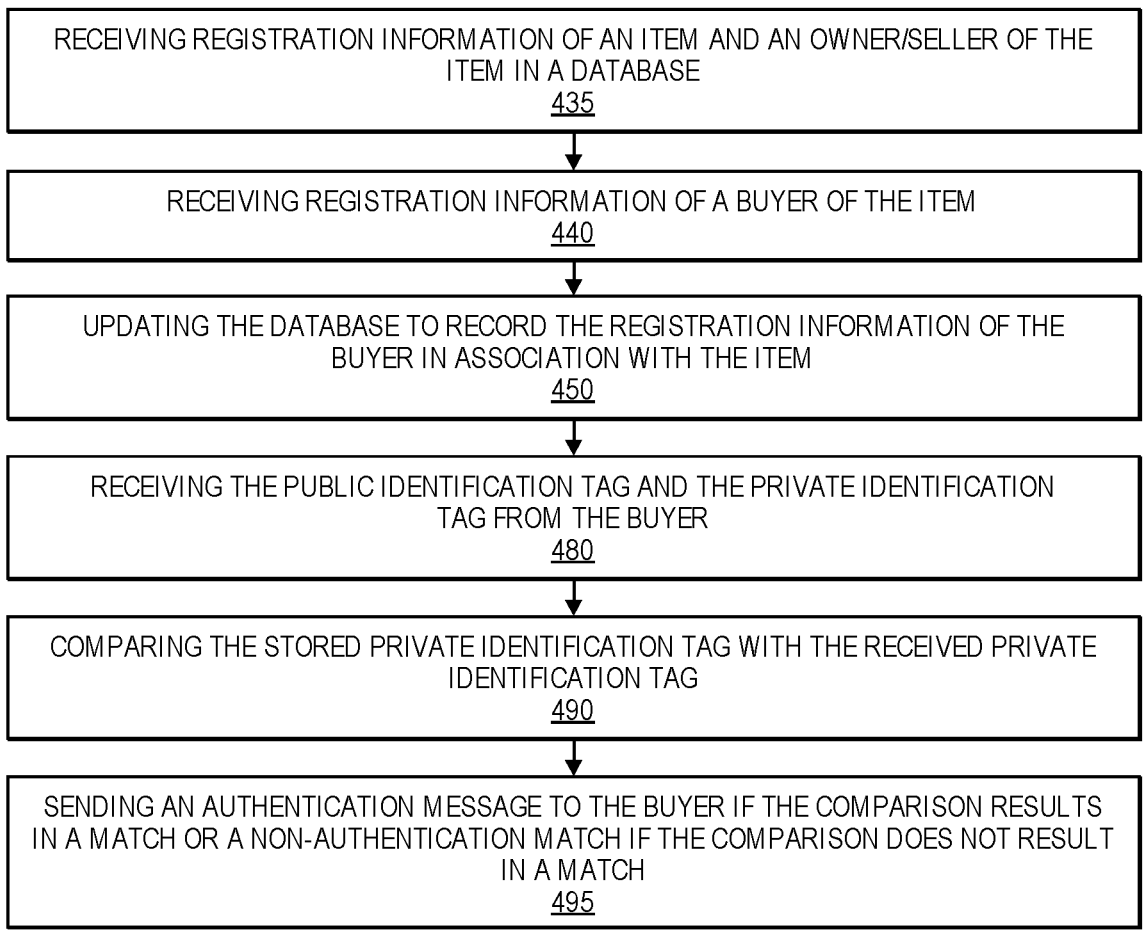
Figure 13:
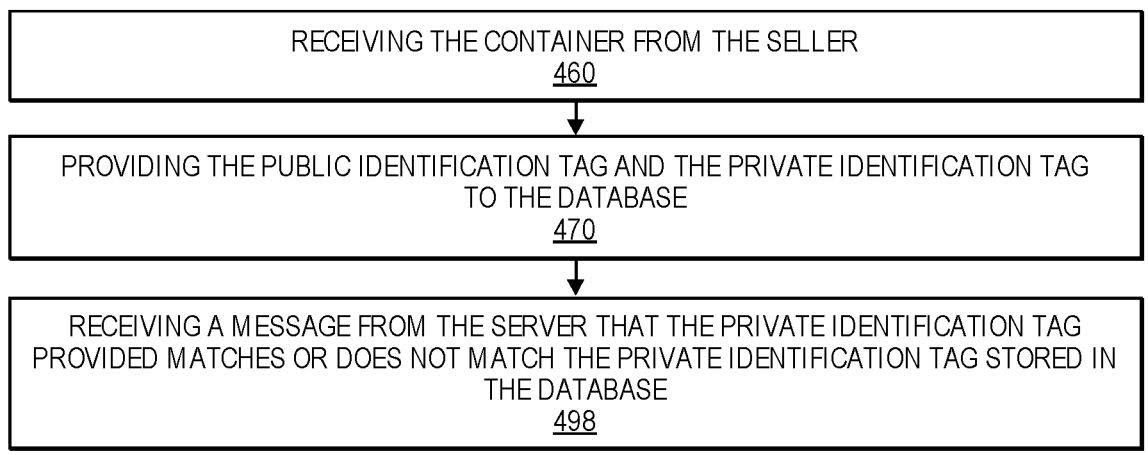

FIGS. 11-13 show flow charts for a method of authenticating an item and a transaction between a buyer and a seller of the item according to one embodiment. The flow charts will be described concurrently. In other embodiments, the method of operations performed in each flow chart may, in certain instances, be performed in a different order then presented in the flow chart or need not all be performed. Referring to FIG. 11, a method performed by an owner or seller is described. At block 410, a seal having optional public identification tag on the first side and a private identification tag on the second side is provided. At block 420, the public identification tag and private identification tag are stored such as by the seller registering the item in the database along with the public and private identification tags. At block 430, the method includes affixing the seal on a container containing the item or a representation of the item, when the seal is not broken, the public identification tag is visible and the private identification tag is not visible. At block 435, the seller provides the container to a buyer of the item.

FIG. 12 shows a flow chart of a method performed by a server, such as server 85 described with reference to FIG. 4, associated with registering an item and owner/seller information and buyer or potential buyer information. Referring to FIG. 12, at block 435, the method includes receiving information of an item and the owner/seller of an item. The registration information includes, in one embodiment, information about the location of the item and the optional public tag and the private tag of a seal associated with the item (e.g. on the container containing the item or a representation of the item). Where the item is sold by an owner/seller to a buyer, at block 440, the registration information of the buyer is received by the database. At block 450, the database is updated to record the registration information of the buyer as the owner of the item.

FIG. 13 shows a flow chart of a method performed by the buyer of the item to authenticate the item. At block 460, the buyer receives the container from the seller. At block 470, the public identification tag and private identification tag are provided by the buyer to the database. Referring to FIG. 12, at block 480, the public identification tag and the private identification tag are received by the server from the buyer. At block 490, the stored private identification tag is compared to the private identification tag received from the buyer. At block 495, if the comparison results in a match, an authentication message is sent. If the comparison does not result in a match, then a non-authentication message is sent. Referring to FIG. 13, at block 498, the buyer receives a message from the server regarding whether the private identification tag provided matches the stored private identification tag.

In the preceding paragraphs, various embodiments are described including various items. It is appreciated that items of any type may be registered and transferred as described herein. Another example is the ownership and transfer/sale of medication or medical supplies. It is appreciated that purchasers of such items desire confidence that they are purchasing authentic and not counterfeit medication or medical supplies. Registering and tracking ownership and verifying authenticity of medication and medical supplies according to the techniques described can be used to provide a level of confidence that the medication and medical supplies are authentic.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method comprising:
registering an item with an electronic database, the registration comprising a registrant's ownership information and identification information of a seal; and
affixing the seal to a container having the item or a representation of the item to secure the item or the representation of the item inside the container, wherein the seal has a post that is positioned through one or more openings of the container, while the seal is affixed to the container, wherein the seal comprises the identification information, wherein the identification information is inaccessible while the seal is affixed to the container and the post of the seal is intact, and wherein the seal must be separated from the container by breaking the post to access 1) the identification information and 2) the item or representation of the item.

2. The method of claim 1, further comprising:
registering a buyer of the item in the electronic database as a new owner of the item, the registration comprising information about the buyer.

3. The method of claim 2, wherein registering the buyer comprises providing a server with the identification information of the seal and the information about the buyer to update a chain of title to reflect the buyer as the new owner.

4. The method of claim 1, wherein the seal comprises a cap that contains the identification information, wherein the cap of the seal must be broken and removed from the seal to access the identification information.

5. The method of claim 1 further comprising receiving, from a server, an authentication message verifying the item is the registered item in response to providing the server with the identification information, wherein the server verifies the item by comparing the provided identification information with previously stored identification information in the electronic database.

6. The method of claim 1, wherein the seal comprises a first seal portion that is configured to permanently couple to a first end of the post and a second seal portion that is configured to permanently couple to a second end of the post, wherein both portions are permanently coupled such that when either portion is removed from the post, the portion cannot be recoupled.

7. The method of claim 6, wherein, while the seal is affixed to the container, the first seal portion is exposed or visible on top of the container and the second seal portion is enclosed inside the container.

8. The method of claim 7, wherein the identification information is a private identification tag on the second seal portion that is not visible while the seal is not broken, wherein the seal further comprises a public identification tag on the first seal portion that is visible regardless of whether the seal is broken or not, wherein the method further comprises:

storing the public identification tag and the private identification tag in the electronic database.

\* \* \* \* \*